UNITED STATES PATENT OFFICE.

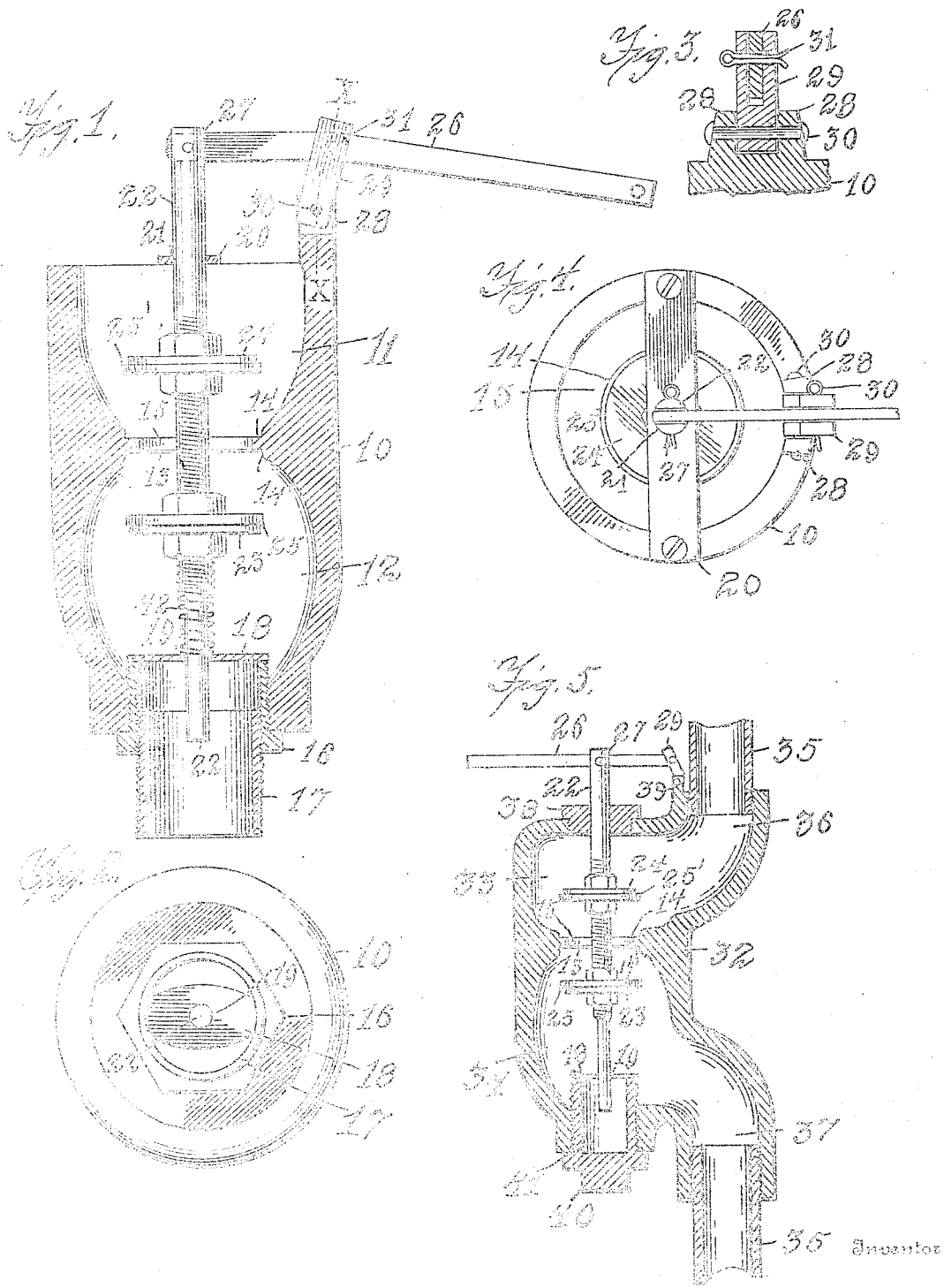

OSCAR L. SMEDBERG, OF JAMESTOWN, NEW YORK.

VALVE.

1,055,673.  Specification of Letters Patent.   Patented Mar. 11, 1913.

Application filed November 10, 1910. Serial No. 591,582.

*To all whom it may concern:*

Be it known that I, OSCAR L. SMEDBERG, a citizen of the United States, residing at Jamestown, county of Chautauqua, and State of New York, have invented new and useful Improvements in Valves, of which the following, taken in connection with the accompanying drawings, is a full, clear, and exact description.

The invention relates to double acting valves; and the object of the improvement is to provide two connected valves with means for operating the valves which shall cause said valves to seat correctly upon the valve seats in the control of high pressures of gas and other fluids; and the invention consists in the construction and arrangement of the parts as described in this specification and shown in the accompanying drawings.

In the drawings, Figure 1 is a sectional view of the preferred form of the valve. Fig. 2 is a bottom plan view as shown in Fig. 1. Fig. 3 is a sectional view at line X X in Fig. 1. Fig. 4 is a top plan view of the valve, as shown in Fig. 1. Fig. 5 is a lengthwise sectional view of a modification of the valve as adapted to use on a continuous pipe or gas main.

Similar numerals refer to corresponding parts in the several views.

The numeral 10 indicates the preferred form of valve casing. Casing 10 is arranged with the two chambers 11 and 12. For certain uses the chamber 11 is preferably left open ended. Between chambers 11 and 12 a partition 13 is provided having the valve seats 14 and 14′ on the opposite sides and the opening 15 therethrough.

At the lower end a bushing or hollow nut 16 is provided into which the pipe 17 is connected. Across the upper end of bushing 16 a guide bar 18 is provided having a hole 19 therein exactly in the center of the opening in the nut 16. Across the upper end of the casing 10 a guide bar 20 is provided with a hole 21 in the center of the opening within the casing so as to be in line with hole 19.

A valve stem 22 is slidably mounted in the holes 19 and 21 and bears thereon in a threaded central portion the two valves 23 and 24, which valves are held in place by suitable nuts on each side of the valve plates. Valves 23 and 24 have packing 25 and 25′ respectively, preferably of leather, so as to set tightly on the valve seats 14′ and 14 respectively, and thereby insure the closing of the opening 15 whichever way the valve stem 22 may be moved.

A lever or operating handle 26 is pivotally attached at 27 to the exposed end of valve stem 22. The upper edge of the casing 10 is extended up in the lugs 28 and a link 29 is pivotally attached by means of a pin 30 through lugs 28 and by a pin 31 to handle 26 so that link 29 works back and forth as the lever or handle 26 is reciprocally moved without moving the valve stem 22 out of line. It is apparent that by this arrangement the valve stem will be held perfectly in line so that one or the other of the valves 23 and 24 will fit perfectly upon its seat in whichever direction the handle 26 is moved.

In Fig. 5 a modified form of the valve is shown with a closed casing 32. Casing 32 has the two chambers 33 and 34, corresponding to chambers 11 and 12, having outlets 36 and 37 to the main pipe line 35. The casing 32 is turned aside from the main line of the pipe and enlarged sufficiently to permit of the insertion of the valves 23 and 24 and to provide the two chambers therefor and the valve seats 14 and 14′ between the chambers. A valve stem 22 is mounted therein through a guide plug 38 at the handle actuated end of the valve stem. A suitable stuffing box may be provided in plug 38 to prevent the escape of the fluid. Lever 26 is attached at 27 to the valve stem 22 and link 29 is pivotally attached to suitable lugs 39 on the edge of the casing 32. At the opposite end of the valve stem, instead of the bushing 16, a plug 40 is provided having a recess 41 therein to receive the end of the valve stem 22, a guide bar 18 with central hole 19 being provided across the opening 41 in plug 40 the same as on bushing 16.

The open-ended valve casing 10 is specially applicable for use within the tank of the gas regulator, shown in Letters Patent Number 973,396. It is apparent that the open end allows the gas free opportunity of escape upon all sides within the regulator tank. A coil spring 42 is preferably placed around shaft 22 between the lower nut for valve 25 and guide bar 18. The strength of spring 42 may be so adjusted to the pressure as to automatically close the valve, when not actuated by lever 26. It is obvious, however, that the valve may be operated by means of lever 26 without the spring 42.

I claim as new:

1. A valve comprising a casing, a central partition in said casing having an opening therethrough, valve seats on the opposite sides of said partition around said opening, guide bars at the opposite ends of said casing having holes therethrough in line with the center of the opening in said partition, a valve stem slidably mounted through said holes in said bars, valve plates mounted on said valve stem with suitable packing adapted to fit the respective valve seats, a link pivotally mounted on said casing, and an operating lever pivotally attached to said link and valve stem, substantially as and for the purpose specified.

2. A valve comprising a casing, a central partition in said casing having an opening therethrough, valve seats on the opposite sides of said partition around said opening, a hollow bushing in one end of said casing, a bar across the inner end of said bushing having a hole therethrough, the opposite end of said casing left open, a bar across said open end of said casing having a hole therethrough, a valve stem slidably mounted through the holes in said bars, valve plates mounted on said valve stem with suitable packing adapted to fit the respective valve seats when said stem is moved endwise, a link pivotally mounted on the open end of said casing and an operating lever pivotally attached to said link and one end of said valve stem, substantially as and for the purpose specified.

In testimony whereof I have signed my name to this specification in the presence of two subscribing witnesses.

OSCAR L. SMEDBERG.

Witnesses:
I. A. ELLSWORTH,
A. W. KETTLE.